United States Patent
Kim

(10) Patent No.: US 8,870,564 B2
(45) Date of Patent: Oct. 28, 2014

(54) HOT RUNNER VALVE APPARATUS FOR AN INJECTION-MOLDING MACHINE

(76) Inventor: Hyuk Joong Kim, Seoul (KR)

(*) Notice: Subject to any disclaimer, the term of this patent is extended or adjusted under 35 U.S.C. 154(b) by 0 days.

(21) Appl. No.: 13/979,744

(22) PCT Filed: Jan. 13, 2012

(86) PCT No.: PCT/KR2012/000342
§ 371 (c)(1),
(2), (4) Date: Jul. 15, 2013

(87) PCT Pub. No.: WO2012/096547
PCT Pub. Date: Jul. 19, 2012

(65) Prior Publication Data
US 2013/0302467 A1    Nov. 14, 2013

(30) Foreign Application Priority Data
Jan. 16, 2011 (KR) .................. 10-2011-0004316

(51) Int. Cl.
*B29C 45/23*    (2006.01)
*B29C 45/28*    (2006.01)
*B29C 45/27*    (2006.01)

(52) U.S. Cl.
CPC ............ *B29C 45/27* (2013.01); *B29C 45/2803* (2013.01)
USPC ............................ 425/566; 425/564; 425/571

(58) Field of Classification Search
USPC .................. 425/564, 566, 567, 568, 571, 574
See application file for complete search history.

(56) References Cited

U.S. PATENT DOCUMENTS

| | | | | |
|---|---|---|---|---|
| 4,917,594 A | * | 4/1990 | Gellert et al. | 425/549 |
| 5,466,141 A | * | 11/1995 | Eckardt et al. | 425/130 |
| 5,851,571 A | * | 12/1998 | Manner | 425/564 |
| 5,882,693 A | * | 3/1999 | Silkowski et al. | 425/130 |
| 6,179,604 B1 | * | 1/2001 | Takeda | 425/547 |
| 6,558,148 B1 | * | 5/2003 | Seres | 425/130 |
| 7,306,455 B2 | * | 12/2007 | Dewar et al. | 425/564 |
| 7,481,649 B2 | * | 1/2009 | Gaillard et al. | 425/549 |
| 7,527,490 B2 | * | 5/2009 | Fairy | 425/130 |
| 7,771,190 B2 | * | 8/2010 | Jenko | 425/564 |
| 7,883,333 B2 | * | 2/2011 | Watanabe et al. | 425/564 |

(Continued)

FOREIGN PATENT DOCUMENTS

KR    20-0280604    7/2002
KR    20-0280605    7/2002

(Continued)

OTHER PUBLICATIONS

International Search Report of International Application No. PCT/KR2012/000342, dated Sep. 10, 2012.

*Primary Examiner* — Yogendra Gupta
*Assistant Examiner* — Emmanuel S Luk
(74) *Attorney, Agent, or Firm* — Kile Park Reed & Houtteman PLLC

(57) ABSTRACT

The present invention relates to a hot runner valve apparatus for an injection-molding machine, which has, instead of a complicated mechanical opening/closing structure, a simple structure that enables an elevating pin, through the interior of which a resin flows, to be elevated, to easily control a supply of the resin injected into a cavity of a mold, so that the molding condition for a small precise part component, or in the event a resin having poor flowability is used, is improved, thereby increasing mass-production capabilities and reducing defects in molded articles.

6 Claims, 14 Drawing Sheets

(56) References Cited

U.S. PATENT DOCUMENTS

| | | | |
|---|---|---|---|
| 8,449,287 B2* | 5/2013 | Catoen | 425/564 |
| 2004/0131722 A1* | 7/2004 | Dufner | 425/564 |
| 2006/0078644 A1* | 4/2006 | Babin | 425/564 |
| 2006/0108713 A1* | 5/2006 | Niewels | 264/328.1 |
| 2008/0089975 A1* | 4/2008 | Fairy | 425/568 |
| 2009/0159828 A1* | 6/2009 | Esser | 251/326 |
| 2010/0007058 A1* | 1/2010 | Fairy | 264/328.16 |
| 2010/0015275 A1* | 1/2010 | Gunther | 425/564 |

FOREIGN PATENT DOCUMENTS

| | | |
|---|---|---|
| KR | 20-0280606 | 7/2002 |
| KR | 20-0290456 | 9/2002 |
| KR | 20-0341515 | 2/2004 |
| KR | 20-0344137 | 3/2004 |
| KR | 10-2005-0002768 | 1/2005 |
| KR | 10-0703055 | 4/2007 |
| KR | 10-2010-0119484 | 11/2010 |

* cited by examiner

HOT RUNNER VALVE APPARATUS FOR AN INJECTION-MOLDING MACHINE

TECHNICAL FIELD

The present invention relates to a hot runner valve apparatus for an injection-molding machine, and more particularly, to a hot runner valve apparatus for an injection-molding machine, which has, instead of a complicated mechanical opening/closing structure, a simple structure that enables an elevating pin, through the interior of which a resin flows, to be elevated, to easily control a supply of the resin injected into a cavity of a mold, so that the molding condition for a small precise part, or in the event a resin having poor flowability is used, is improved, thereby increasing mass-production capabilities and reducing defects in molded articles.

BACKGROUND ART

In general, an injection-molding machine for molding a plastic product is an apparatus for injecting a resin raw material into a manifold from a resin-melted mold clamping cylinder, evenly distributing the injected resin along a resin flow path branched within the manifold to be supplied to each of one or more nozzles combined at a lower portion of the manifold, and then injecting the resin into a molding space formed by upper and lower molds, which are product molding frames, that is, a cavity. The injection-molding machine is configured to open/close a gate, that is, an exit, by an elevating operation of a valve pin, and in a case where relatively several articles are molded at the same time according to the number of molded articles, a manifold type of injection-molding machine receiving the resin through the manifold is used, and in a case where a single article is produced, a single type of injection-molding machine is used.

FIG. 1 is a cross-sectional diagram schematically illustrating a hot runner system for an injection-molding machine elevating a valve pin by using high-pressure air as an operation pressure in the related art. As illustrated in FIG. 1, a valve apparatus for an injection-molding machine for a mold having multi cavities in the related art generally includes a driving unit 100 and a valve apparatus 200, and uses high-pressure air as a driving source for an elevating operation of the valve pin 210. That is, the driving unit 100 is provided with a plurality of air channels 110 and 120, which are pipes for supplying high-pressure air from the outside and discharging high-pressure air to the outside, and has a structure in which a piston 140 within a cylinder housing 130 is elevated by the high-pressure air selectively introduced through the plurality of air channels 110 and 120. In this case, a valve pin 210 is connected with a lower end of the piston chamber 130 to interwork with the piston head 140. Further, the valve pin 210 is elevated through the interworking with the piston 130 to selectively close or open a gate, that is, an exit, forming a leading end of a nozzle 220.

In the meantime, the valve apparatus 200 forms an outer body, and includes a nozzle 220, around which a heater for preventing the resin from being solidified is wound, and has a structure in which the valve pin 210 is installed to be vertically elevated inside the nozzle 220. Here, the nozzle 220 is provided with a resin channel 230 while having a predetermined gap around the valve pin 210, and both ends of the resin channel 230 are connected to an exit of the nozzle and the resin channel 310 of the manifold 300, respectively.

In the valve apparatus for the injection-molding machine for the mold with the multi cavities configured as described above, when a high operation pressure is selectively supplied through the air channels 110 and 120, the piston 140 is raised or lowered, and the valve pin 210 simultaneously interworks with the piston 140, so that an elevating operation is integrally performed. Accordingly, the exit of the nozzle is opened or closed according to the elevation of the piston 140, and as a result, the resin supplied through the manifold 300 is supplied into the mold through the exit, or is blocked.

Briefly, the valve gate (exit) apparatus for the injection-molding machine operated having the air pressure as the operational resource in the related art selectively supplies high-pressure air inside the cylinder housing 130 through the corresponding air channels 110 and 120, to elevate the piston head 140, and in this case, the valve pin 210 interworks with the piston head 140 to open/close the exit (gate) of the nozzle.

However, the valve apparatus according to the related art having the aforementioned configuration uses high-pressure air as an operation source for raising the valve pin, and thus needs to adopt a sealing structure for preventing air from being discharged, and requires a large pneumatic device (compressor) for supplying an operational pressure, so that a volume thereof is increased and thus a structure thereof becomes complex, thereby having disadvantages of many limits in an installation space and extremely poor maintenance and management.

Further, in a case where the valve apparatus is applied to the mold having multi cavities including several nozzles, a deviation is generated in the amount of injection of each nozzle due to a size distribution of each nozzle, so that there is difficulty in mass production of molded articles having a uniform quality.

In order to solve the problem, the applicant obtains the registration of the utility models for a valve apparatus for vertically operating a valve pin by power through Korean Utility Model Application No. 2002-09883 (Registration No. 0280604, decided to be granted), Korean Utility Model Application No. 2002-09884 (Registration No. 0280605, decided to maintain the registration), Korean Utility Model Application No. 2002-09885 (Registration No. 0280606, decided to maintain the registration, Korean Utility Model Application No. 2002-19175 (Registration No. 0290456, decided to maintain the registration), Korean Utility Model Application No. 2003-0034932 (Registration No. 0341515, decided to maintain the registration), and Korean Utility Model Application No. 2003-0038360 (Registration No. 0344137, decided to maintain the registration). In schematically reviewing a configuration of the valve apparatus, the valve apparatus generally includes a nozzle and a driving means, and in this case, has a general valve structure in which the nozzle is provided with a resin flow path for receiving a resin therein and injecting the received resin into a mold through an exit provided at a front end portion. Further, a normal reversible motor or a solenoid actuator for raising and lowering the valve pin by a supply of power is used as the driving means. The aforementioned valve apparatus filed in advance by the present applicant may reduce a size of the general valve apparatus by the structure adopting the normal reversible motor or the actuator driven through the supply of the power as the driving source, so that it is possible to increase a degree of freedom in designing the mold and to rapidly and accurately control the amount of movement of the valve pin.

However, in a case where the normal reversible motor serves as the driving source, several valve apparatuses filed in advance by the present applicant need to include a decelerator, and also need to adopt a cooling structure for cooling the motor, so that several valve apparatuses have complex structures, thereby causing difficulty in economically manufacturing the valve apparatuses.

In the meantime, in a case of the actuator using a solenoid principle, it is possible to relatively simplify a structure, but there is a disadvantage in that driving is not smoothly performed at a time at which the valve pin moves to a relative position in a state where the exit is opened or closed. This is not a phenomenon generated only in the solenoid actuator. The valve pins in almost all of the hot runner systems have a state in which ends thereof are fitted to the exit and the other end thereof is fitted to a bushing supporting the valve pins so as to allow a straight motion when closing the exit (gate). In a case where the valve pin is elevated in order to open the exit in this state, power, that is, large power, sufficient to overcome stop resistance applied to the valve pin (frictional resistance due to a support element, such as the bushing supporting the valve pin and the like, and frictional resistance applied when the valve pin is fitted to the exit) is required. That is, in most of the hot runner systems, a driving source with an output higher than a rated output is applied in order to overcome frictional resistance applied at an initial state when the valve pin moves to the relative position in a state where the valve pin is raised or lowered, and perform the lowering or raising operation of the valve pin.

Accordingly, the driving source (a hydraulic pneumatic cylinder housing, the normal reversible motor, and the actuator) with a high output is demanded, such that manufacturing cost is increased, and a volume of the valve apparatus is increased, such that a degree of application freedom for a mold for molding a small and precise injection-molding article is considerably limited. Especially, in a case where a small and precise component is molded, or a product is molded by using a resin containing glass fiber or a magnesium ingredient having poor flowability, there is a problem in that the valve pin is not smoothly elevated.

Further, an end portion of the nozzle is in contact with the mold, so that heat of the nozzle is lost to the mold, and when the resin flows, the resin maintains a melted state by a heater wound around an exterior surface of the nozzle, but when the flow of the resin is stopped, the resin at the end portion of the nozzle is solidified due to heat loss generated at the end portion of the nozzle, and thus an injection process needs to be temporarily stopped until the solidified resin is melted again, thereby degrading production capability and generating poor molding in a case where the solidified resin is not completely melted.

In order to solve the problem, a heating means using a high frequency or a low pressure method is additionally mounted in order to rapidly heat the end portion of the nozzle in the related art, however, the mold, which is in contact with the end portion of the nozzle, is damaged due to the rapid heating of the end portion of the nozzle, thereby leading to a severe problem of shortening a lifespan of the mold. Further, the heating means using the high frequency and the low pressure method is installed around the nozzle, so that the entire volume of the valve apparatus is increased, and thus the degree of design freedom is restricted, and it is impossible to apply the heating means by the high frequency and the low pressure method to the mold for manufacturing a small and precise molded article, a structure of the heating means becomes complex, so that it is difficult to maintain and manage the heating means, and high-priced high frequency and low pressure equipment needs to be additionally installed, so that economic feasibility is decreased.

DISCLOSURE

Technical Problem

The present invention is conceived to solve the problem in the related art, and an object of the present invention is to provide a hot runner valve apparatus for an injection-molding machine, which easily controls a supply of a resin injected into a cavity of a mold by using solidification and melting phenomenon of the resin by a temperature difference between a nozzle and the mold without adopting a mechanical cover structure for a gate, so that a preferable molding condition for a small and precise component or a resin having poor flowability is created, thereby improving quality and mass production capability of molded articles.

Technical Solution

In order to achieve the above object, the present invention provides a hot runner valve apparatus for an injection-molding machine comprising a manifold provided with a resin path, a nozzle connected to one side of the manifold to receive a resin and guide the received resin to a cavity side of a mold, the nozzle having an exterior peripheral surface around which a heater is wound, and a driving means including an elevating element elevated by using hydraulic pressure, pneumatic pressure or a motor, in which the nozzle includes a body provided with an installation hole passing through a center thereof, and an exit hole having a decreased diameter compared to the installation at a lower side thereof, and the hot runner valve apparatus comprises an elevating pin, one end of which is slidingly fitted to the installation hole and one side of which is connected to the elevating element to interwork, so that a lower end portion of the elevating pin is positioned inside the nozzle when the elevating pin is raised, and a lower surface of the elevating pin is in contact with the mold when the elevating pin is lowered, and an upper end portion of which is connected to the resin path so as to receive the resin and a lower end portion of which is provided with a flow control tip appearing while passing through the exit hole so that the received resin is injected to the cavity of the mold.

As a preferable characteristic of the present invention, the elevating pin is provided with a resin flow path connected to the manifold at a center thereof, and an extraction path connected with the resin flow path passes through the center of the flow control tip.

As another preferable characteristic of the present invention, the elevating pin is provided with a resin flow path connected to the manifold at a center thereof, and is provided with two to six side extraction paths at a portion connected with the flow control tip.

As yet another preferable characteristic of the present invention, the driving means includes a cylinder housing provided with air channels for supplying and discharging high-pressure air from and to the outside, and a piston which is an element provided inside the cylinder housing to be elevated by high-pressure air selectively introduced through the air channels, and one exterior end portion of the elevating pin, which does not interfere the position when the elevating pin is elevated, is integrally connected with an interior side of the piston to interwork with the piston.

As still another preferable characteristic of the present invention, the driving means includes a bushing, which is connected with the resin path of the manifold at one side of an upper portion of the driving means, and into which the upper end portion of the elevating pin is slidingly inserted.

As still yet another preferable characteristic of the present invention, the body is provided so as to form a heat blocking gap between a lower surface of the body and the mold.

According to the hot runner valve apparatus for the injection-molding machine according to the present invention, the elevating pin provided with the resin flow path inside the nozzle is elevated so that the end of the elevating pin is selectively in contact with or spaced apart from the mold, so that it is possible to control a flow of the resin supplied to the cavity side of the mold by using a phenomenon in which the resin inside the end of the elevating pin is solidified and melted, thereby achieving mechanical simplicity and economical manufacturing, and improving reliability of an operation.

Especially, since a complicated cover structure for controlling the resin flow path is not required, it is possible to simplify a structure of the valve apparatus, and thus increase a degree of designing freedom, and also it is possible to prevent defects in molding due to a blockage of the resin flow path in advance according to the use of the solidification and melting phenomenon of the resin by a temperature difference in a peripheral portion of the elevating pin when the elevating pin is lowered and raised, and thus it is possible to improve molding conditions for a small and precise component or a resin containing an ingredient having poor flowability, thereby considerably improving a quality of a molded article and mass production capability.

The characteristics and advantages of the present invention will be clearer through the detailed description referring to the accompanying drawings. Prior to this, terms or words used in the present specification shall not be construed as being limited to typical or lexical meaning, and shall be construed as a meaning and a concept conforming to the technical spirit of the present invention pursuant to the principle that an inventor may appropriately define a concept of a term for describing the invention himself/herself by the best method.

Figure 1:
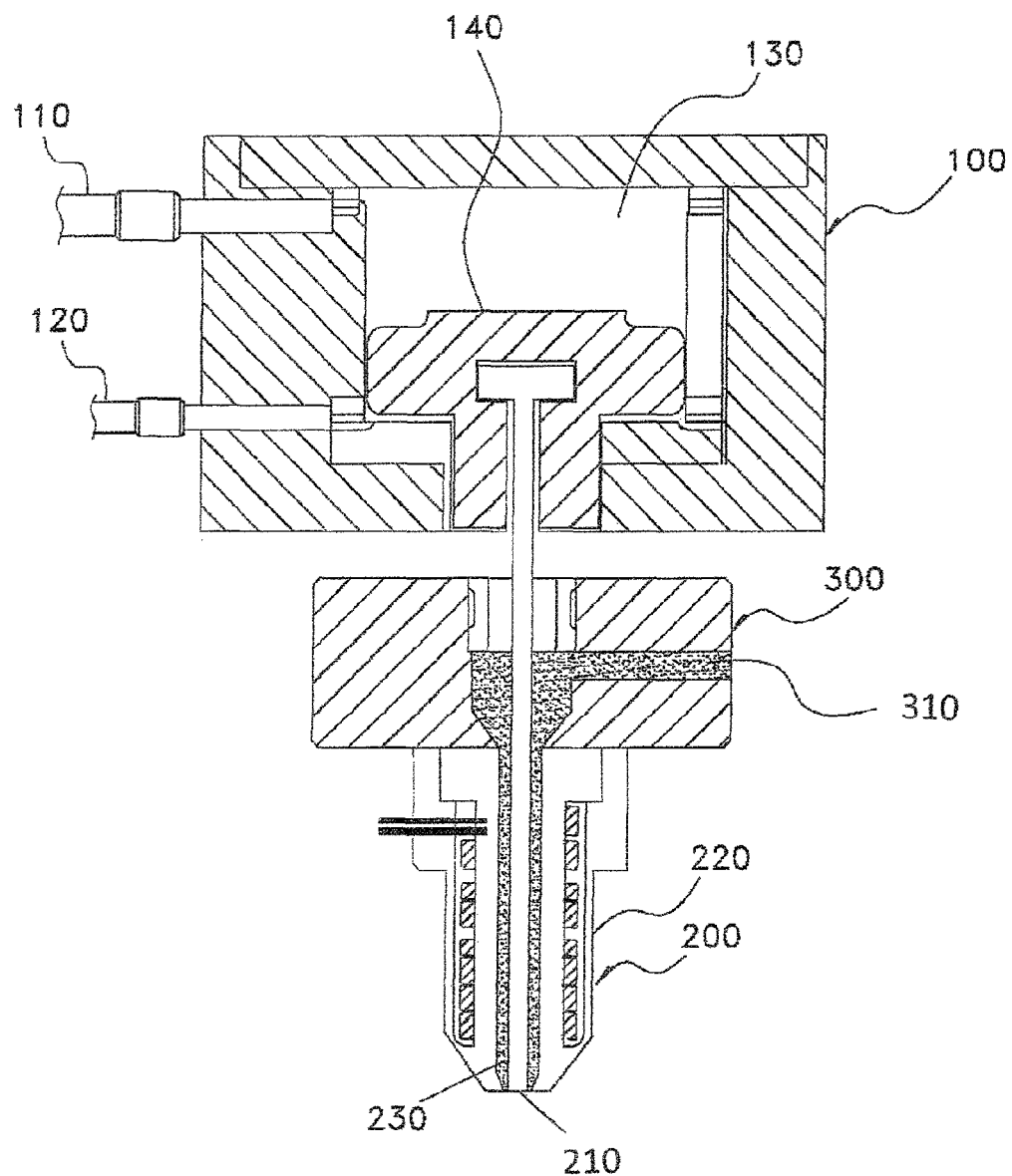
FIG. 1 is a cross-sectional diagram schematically illustrating a structure of a hot runner valve apparatus for an injection-molding machine employing pneumatic pressure as operational pressure in the related art.

[Description of Main Reference Numerals of Drawings]

| | |
|---|---|
| 1: Valve apparatus | 10: Manifold |
| 20: Nozzle | 21: Body |
| 22: Guide hole | 23: Heater |
| 30: Elevating pin | 31: Body |
| 32: Gate | 33: Piston |
| 35: Connection part | 40: Driving means |
| 41: Cyliner housing | 42: Bushing |
| c: Cavity | m: Mold |
| r: Melted resin | r': Solidified resin |

BEST MODE

Hereinafter, a hot runner valve apparatus for an injection-molding machine according to an exemplary embodiment of the present invention will be described with reference to the accompanying drawings. First, it should be noted that the same elements or components in the drawings will be designated by the same reference numerals. In describing the present invention, a detailed description of publicly known functions or configurations will be omitted so as not to make the subject matter of the present invention unclear.

Figure 2:
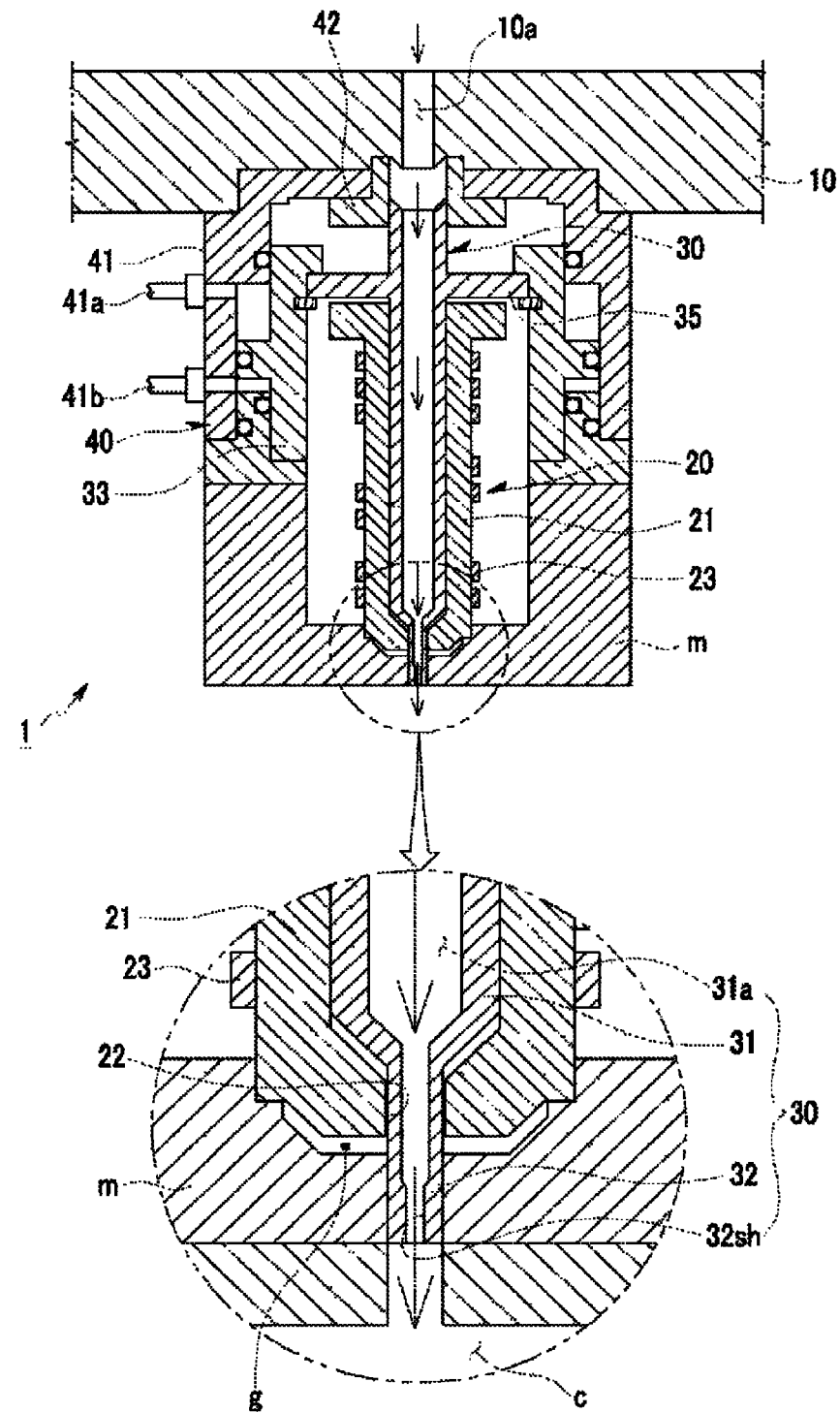
FIGS. 2 and 3 are cross-sectional diagrams for describing a configuration of a hot runner valve apparatus for an injection-molding machine according to an exemplary embodiment of the present invention.
Figure 3:
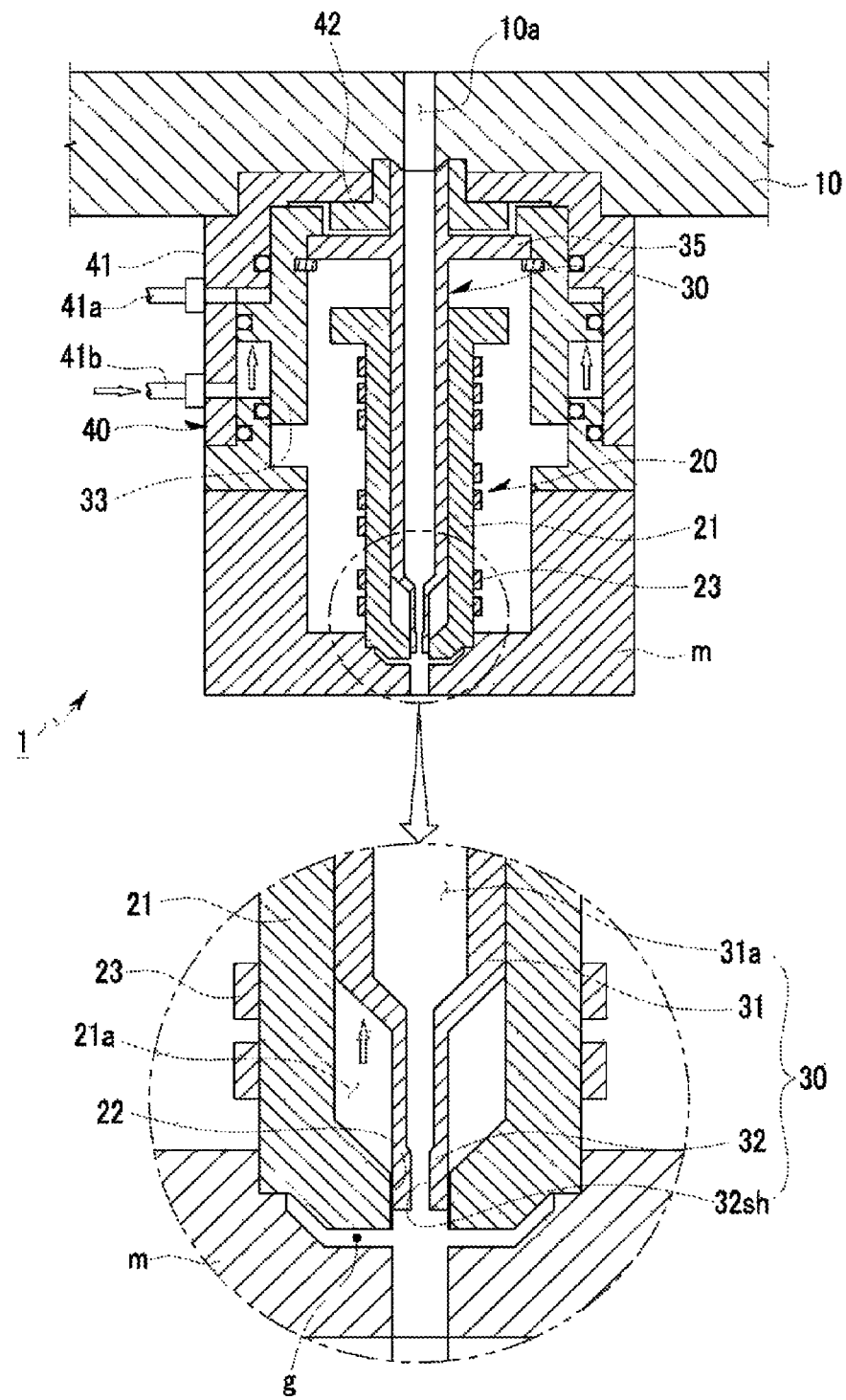
Figure 4:
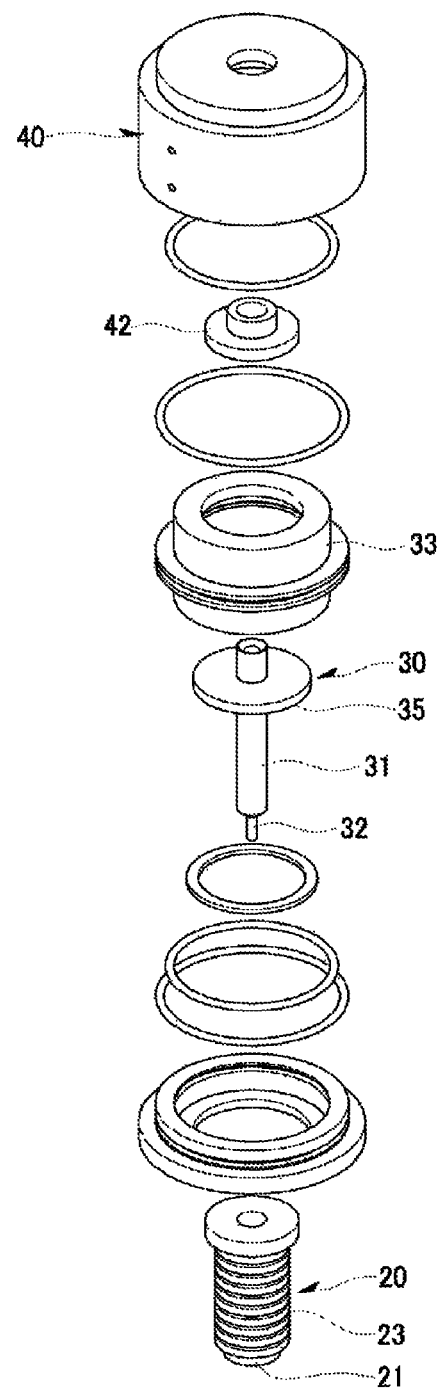
FIG. 4 is an exploded perspective view for describing a principal configuration of the hot runner valve apparatus for the injection-molding machine according to the exemplary embodiment of the present invention.
Figure 5:
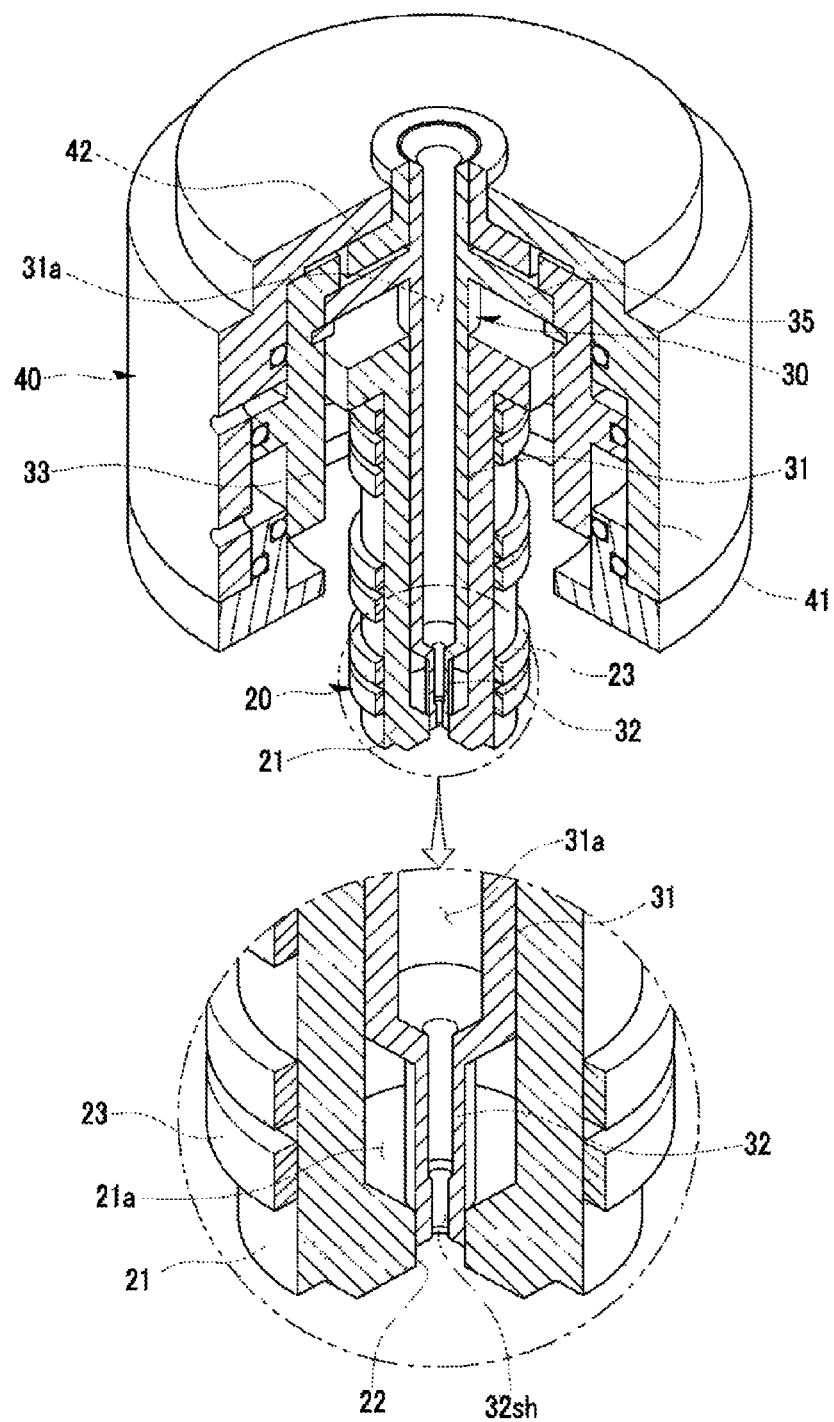
FIGS. 5 and 6 are cut perspective views for describing a principal configuration of the hot runner valve apparatus for the injection-molding machine according to the exemplary embodiment of the present invention.
Figure 6:
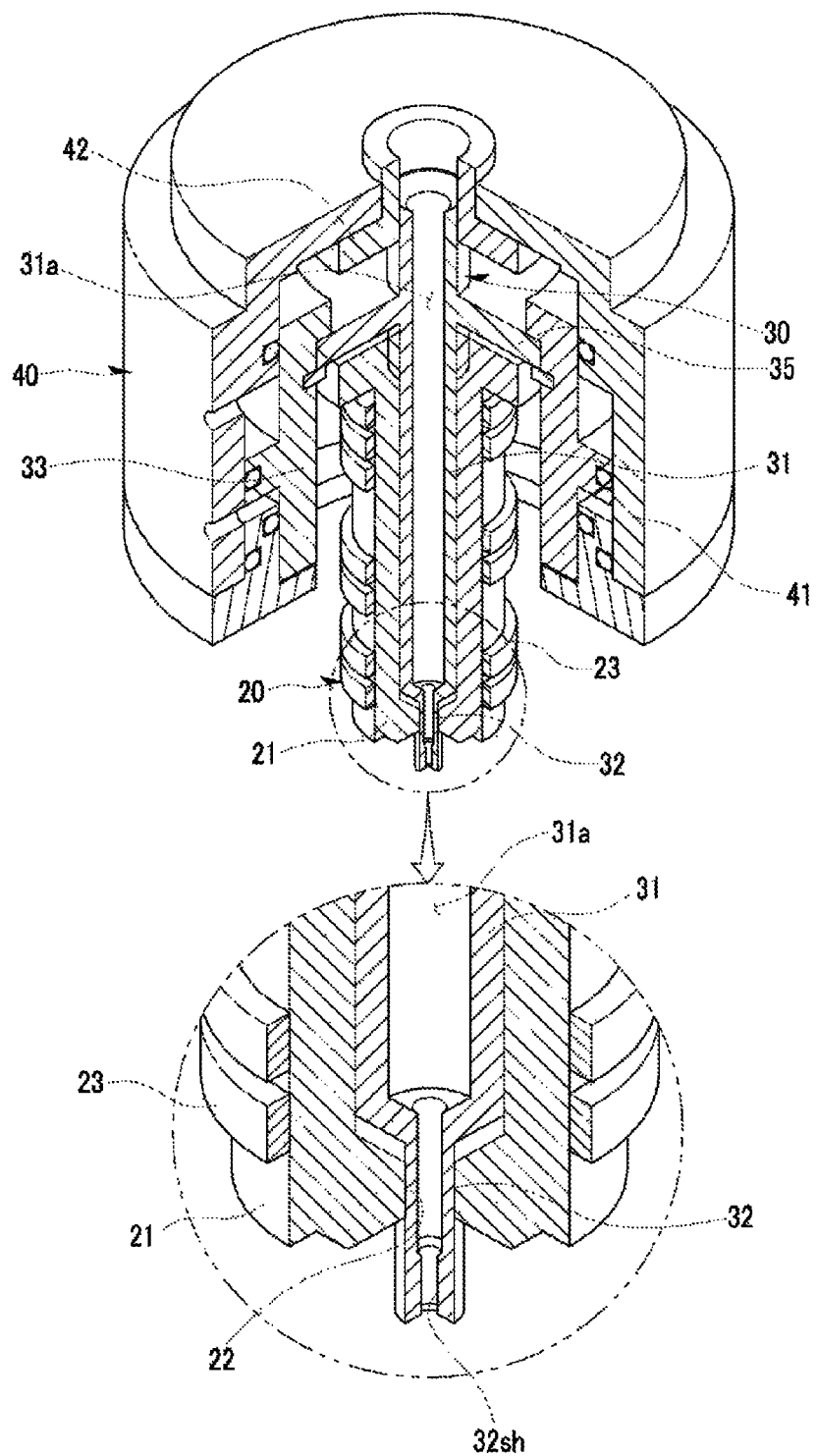
Figure 7:
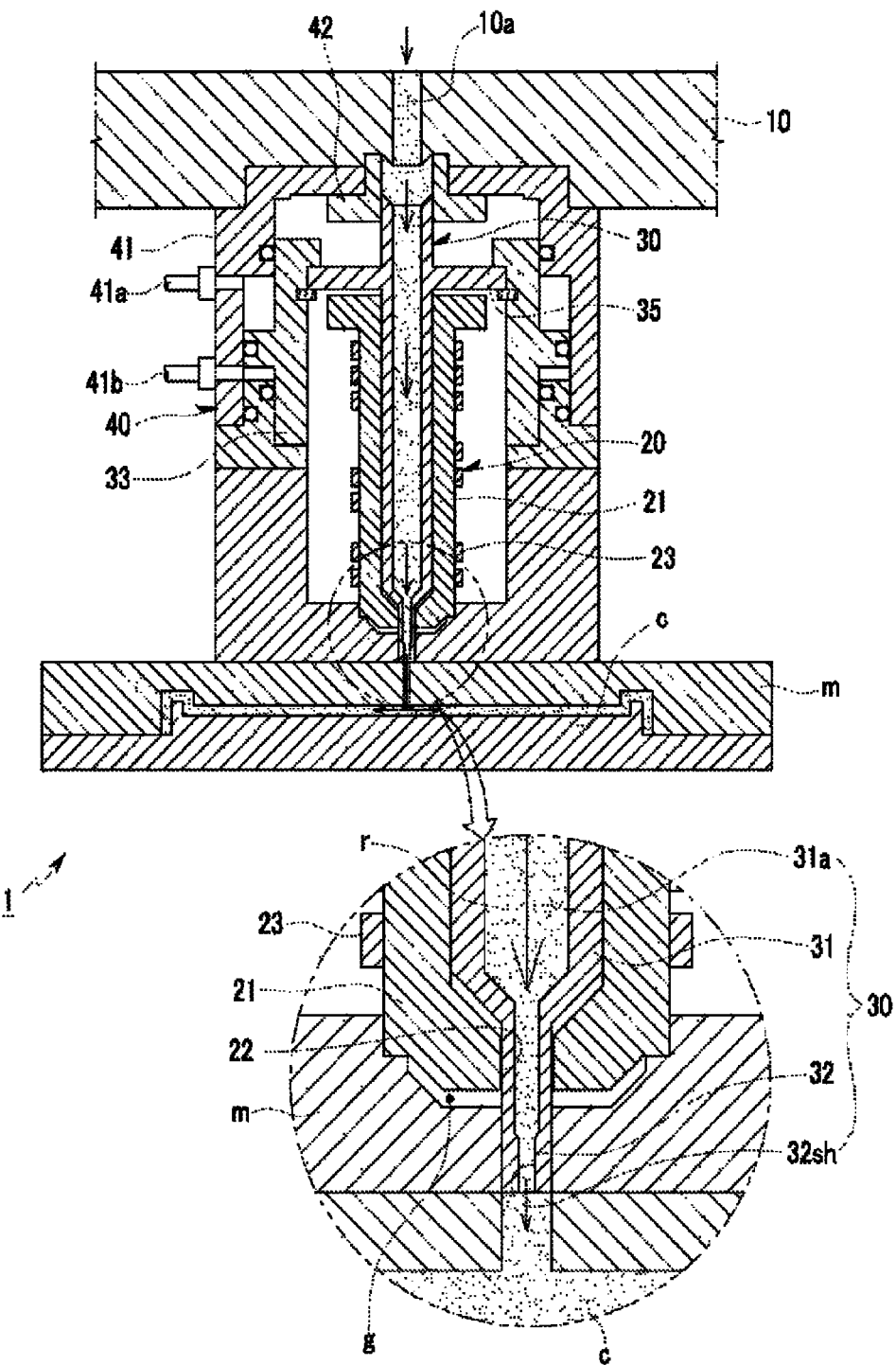
FIGS. 7 to 10 are cross-sectional diagrams for describing an operation of the hot runner valve apparatus for the injection-molding machine according to the exemplary embodiment of the present invention.
Figure 8:
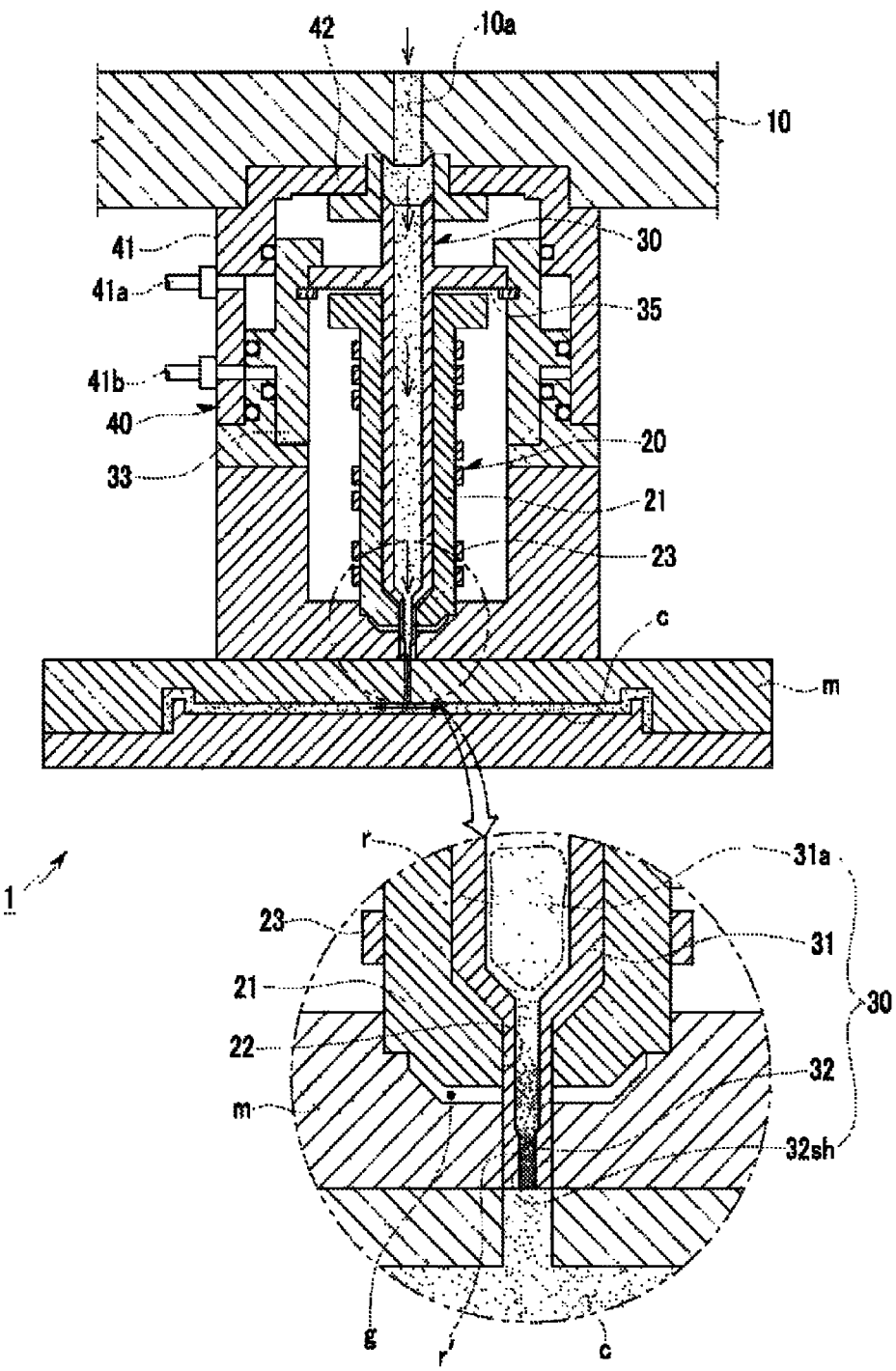
Figure 9:
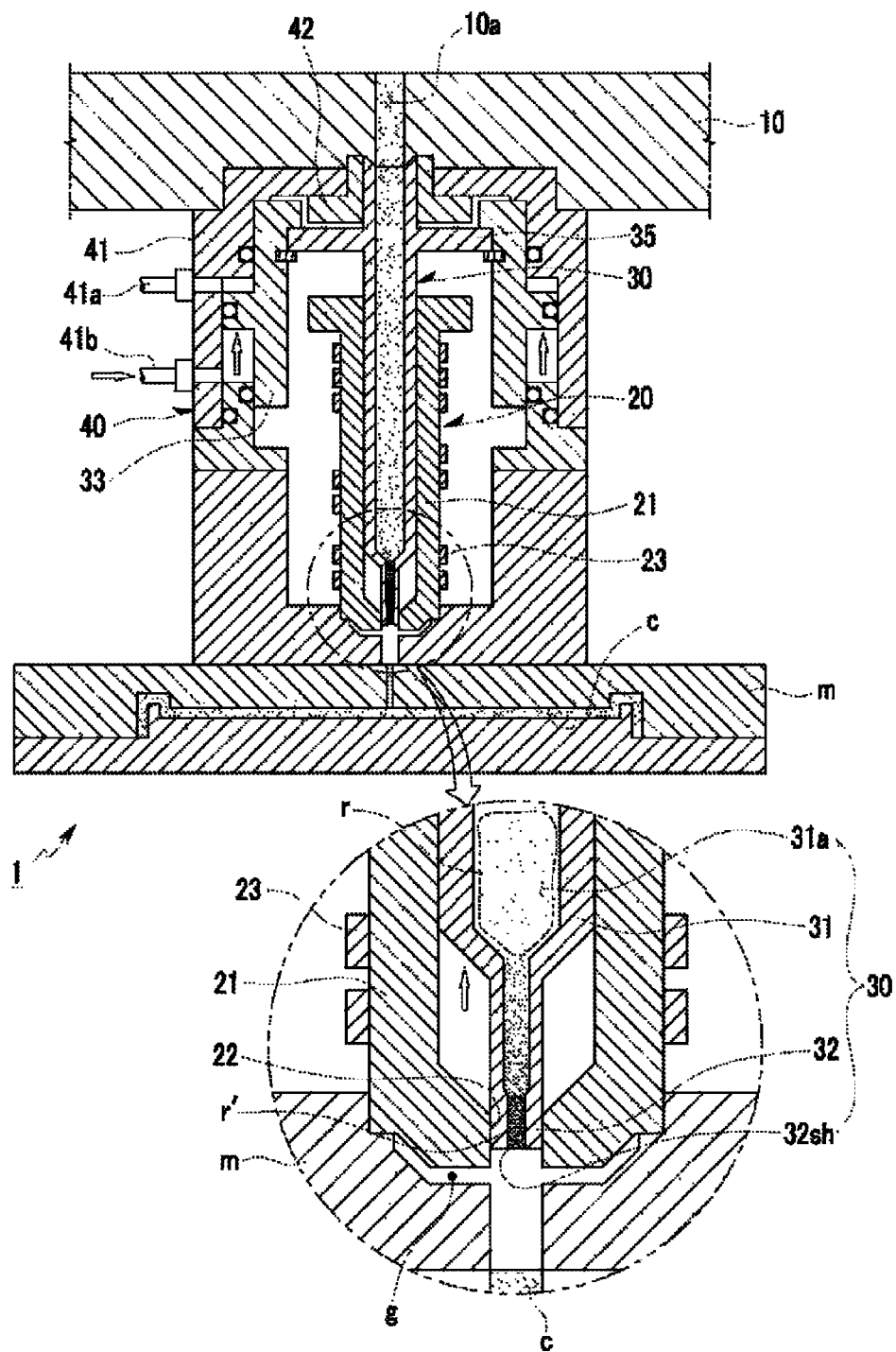
Figure 10:
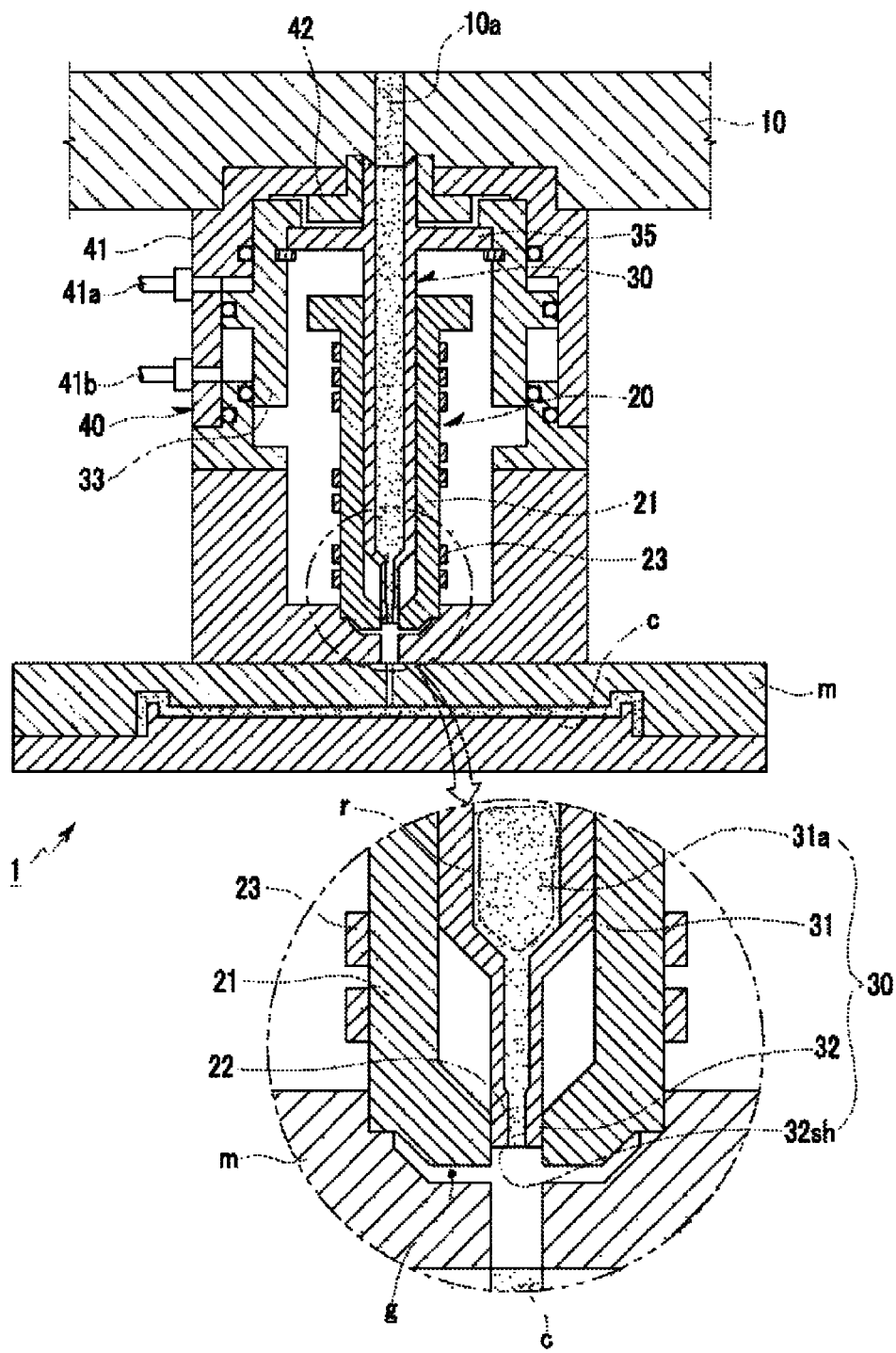

FIG. 2 is a cross-sectional diagram illustrating a state in which an elevating pin is raised in a hot runner valve apparatus for an injection-molding machine according to an exemplary embodiment of the present invention, and FIG. 3 is a cross-sectional diagram illustrating a state in which the elevating pin of FIG. 2 is lowered. Further, FIG. 4 is an exploded perspective view for describing a principal configuration of the hot runner valve apparatus for the injection-molding machine according to the exemplary embodiment of the present invention, and FIGS. 5 and 6 are cut perspective diagrams illustrating states where the elevating pin is raised and lowered. Last, FIG. 7 illustrates a state where the elevating pin is lowered in order to inject a resin into a cavity of a mold in the hot runner valve apparatus for the injection-molding machine according to the exemplary embodiment of the present invention, FIG. 8 illustrates a state where the resin around an extraction path in a state where a supply of the resin is interrupted is molded according to completion of the injection of the resin into the cavity of the mold, and FIG. 9 illustrates a state where the elevating pin is raised for a next injection process in the state of FIG. 8. Further, FIG. 10 illustrates a state where the solidified resin around the extraction path of FIG. 9 is melted by a temperature of a body around which a heater is wound.

A configuration of the hot runner valve apparatus 1 for the injection-molding machine of the present invention will be described with reference to the drawings. First, the hot runner valve apparatus 1 for the injection-molding machine of the present invention generally includes a manifold 10 provided with a resin path 10a therein so as to receive resin from an injection cylinder (not illustrated) and branch the received resin into several parts, a nozzle 20 connected to one side of the manifold 10 to receive the resin and inject the received resin into a cavity c of a mold m, an elevating pin 30 installed inside the nozzle 20 to control a flow of the resin injected inside the cavity c of the mold m through selective elevation thereof, and a driving means 40 for selectively changing positions of the elevating pin 30 to upper and lower positions.

The manifold 10 is manufactured in a shape of a panel formed of a metal material having excellent thermal conductivity, and the resin path 10a through which the liquid resin in a melted state moves is formed in a branched form inside the manifold 10. Further, a heater (not illustrated) is buried in upper and lower surfaces of the manifold 10 in order to prevent the resin flowing through the resin path 10a from being solidified. Further, the manifold 10 is provided with the nozzle 20 to be described below and the driving means 40 for elevating the elevating pin 30, which is provided inside the nozzle 20 to be elevated, in a lower side based on the drawing. The manifold 10 having the above configuration is carried out by the publicly known technology, so that a detailed description thereof will be omitted.

The nozzle 20 includes a tube-shaped body 21 having a hollow cylindrical shape, and an exterior peripheral surface of the body 21 is wound with a heater 23, which is a heating body. Further, an installation hole 21a passes through a center of the body 21, and an exit hole 22 having a decreased diameter compared to the installation hole 21a passes through a lower surface of the body 21. That is, the nozzle 20 is provided with the installation hole 21a connected with the resin path 10a of the aforementioned manifold 10 at an interior center thereof, and is provided so that the elevating pin 30 to be described below may be elevated in a state where an end of the elevating pin 30 is slidingly inserted into the installation cylindrical aperture 21a. The nozzle 20 may be provided to form a heat blocking gap g between a lower surface thereof and the mold as illustrated in the drawing. To this end, in the present invention, a boundary portion of the lower surface of the body 21 of the nozzle 20 is extended to the mold, and the lower surface thereof has the heat blocking gap g, which is a predetermined gap with the mold m. Here, resin supply elements including the elevating pin 30 together with the nozzle 20 have a higher temperature than that of the mold m, so that the heat blocking gap g aims to minimize heat loss generated in the lower surface of the body 21 of the nozzle 20 adjacent to the mold m through an opening. That is, the nozzle 20 needs to maintain the resin in a melted state so that the nozzle 20 is heated at approximately 250 to 350° C., but the mold is maintained at a relative low temperature of 60 to 90° C. for molding a molded article. Accordingly, when the lower surface of the nozzle 20 is in direct contact with the mold m, flowability of the resin deteriorates at an end portion of the body 21 of the nozzle 20 due to rapid heat loss, so that in the present invention, as an alternative for relieving the deterioration of the flowability of the resin, the lower surface of the body 21 of the nozzle 20 and the mold m are disposed while having the heat blocking gap g that is the opening therebetween.

The elevating pin 30, which is a tube-shaped member having an empty interior space so that the end of the elevating pin 30 is slidingly fitted to the installation cylindrical aperture 21a of the body 21 forming the nozzle 20, is provided to selectively have upper and lower position displacement through a connection between one side of the elevating pin 30 and the elevating element of the driving means 40. When the elevating pin is raised, a lower end portion thereof is positioned inside the nozzle 20, and when the elevating pin is lowered, the lower surface thereof is in contact with the mold. That is, the elevating pin 30 is disposed to be connected to the resin path 10a of the manifold 10 and a bushing 42 to be described below so as to receive the resin through an upper end portion thereof, and the lower end portion of the elevating pin 30 has a decreased diameter so as to inject the resin received through the manifold 10 to the cavity c of the mold m, and is provided with a flow control tip 32 having a diameter enough to pass through the exit hole 22 of the body 21 to appear/disappear. Further, the elevating pin 30 is provided with a resin flow path 31a connected to the manifold 10 at a center thereof, and an extraction path 32h connected with the resin flow path 31a passes through the center of the flow control tip 32. Accordingly, when the elevating pin 30 having the aforementioned configuration receives the resin through the resin flow path 31a connected with the resin path 10a of the manifold 10, the resin is discharged into the cavity c of the mold m through the extraction path 32h of the flow control tip 32 formed at the end portion of the lower side of the elevating pin 30.

The driving means 40 is fixedly installed at one side of the manifold 10 to generate driving force elevating the elevating pin 30, and a publicly known hydraulic or pneumatic cylinder type using hydraulic or pneumatic pressure may be applied or a motor type using a motor filed in advance by the present applicant may be applied as the driving means 40. In the present invention, the application of the widely used hydraulic or pneumatic cylinder housing type is described as an example for convenience of description, but various types of driving source may be used if the driving source has a structural characteristic capable of elevating the elevating pin 30. In the present exemplary embodiment, the driving means 40 is a driving element for providing elevating force to the elevating pin 30 installed inside the body 21 of the nozzle 20, and includes a cylinder housing 41 forming an exterior body, and a piston 33 installed inside the cylinder housing 41 to receive an operational pressure formed of high-pressure air and thus have a position displacement in upward or downward. That is, the driving means 40 includes the cylinder housing 41 provided with at least two air channels 41a and 41b having a sealed structure to supply and discharge high-pressure air from and to the outside, and the piston 33, which is the elevating element, provided inside the cylinder housing 41 to be raised or lowered by high-pressure air selectively applied through the air channels 41a and 41b.

In the meantime, the piston 33 is connected with a connection part 35 provided at an end of an exterior side of the elevating pin 30 in one surface inside the piston 33, and in this case, the connection part 35 is provided at a position at which a position of the elevating pin 30 does not interfere with the connection part 35 while the elevating pin 30 is elevated. Further, the driving means 40 includes the bushing 42, which is connected with the resin path 10a of the manifold 10 based on the upper portion thereof, and into which the upper end portion of the elevating pin 30 is slidingly inserted. Here, the bushing 42 may have a length to which a connection state may be maintained even when the elevating pin 30 is raised or lowered.

An operation of the hot runner valve apparatus for the injection-molding machine according to the present invention including the aforementioned configuration will be described below.

As illustrated in FIG. 7, in a state where the elevating pin 30 is lowered, the part of the flow control tip 32 provided at the lower end portion of the elevating pin 30 passes through the exit hole 22 of the body 21 of the nozzle to be in contact with the mold m. In this state, when the resin supplied from the injection cylinder (not illustrated) is supplied to the resin flow path 31a of the elevating pin 30 via the resin path 10a of the manifold 10 and the bushing 42 of the driving means 40, the melted resin r on the resin flow path 31a is injected into the cavity c of the mold m through the extraction path 32h of the flow control tip 32.

Next, when the injection of the resin for the cavity c of the mold m is completed, a resin supply pressure applied to the resin flow path 31a of the elevating pin 30 is removed, and in this state, as illustrated in FIG. 8, the part of the flow control tip 32 of the elevating pin 30, which is in contact with one side of the mold m, loses heat to the mold m, so that heat is rapidly lost, and thus a phenomenon in which the resin inside the extraction path 32h of the elevating pin 30 is solidified, that is, solidified resin r', is generated. That is, when the resin is completely filled in the cavity c of the mold m, an injection pressure is not applied to the elevating pin 30 and the part of the flow control tip 32 of the elevating pin 30 is simultaneously in contact with the mold m at a relatively lower temperature compared to the nozzle 20, and as a result, the heat of the resin within the flow control tip 32 is lost in a state where the resin does not flow, to form the solidified resin r', and the solidified resin r' serves to close the extraction path 32h of the flow control tip 32. Next, the mold m with the resin filled inside the cavity c is subjected to a process for extracting a molded article, and the elevating pin 30 of the present invention is raised as illustrated in FIG. 9. Then, the solidified resin r' inside the flow control tip 32 of the elevating pin 30 moving into the nozzle 20 is converted to melted resin r by the heater 23 as illustrated in FIG. 10.

In the meantime, the flow control tip 32 in the present invention has a diameter of only several mm, and maintains a state in which the resin does not naturally run down or flow before the injection pressure is applied from the injection cylinder because the resin has viscosity.

Figure 11:
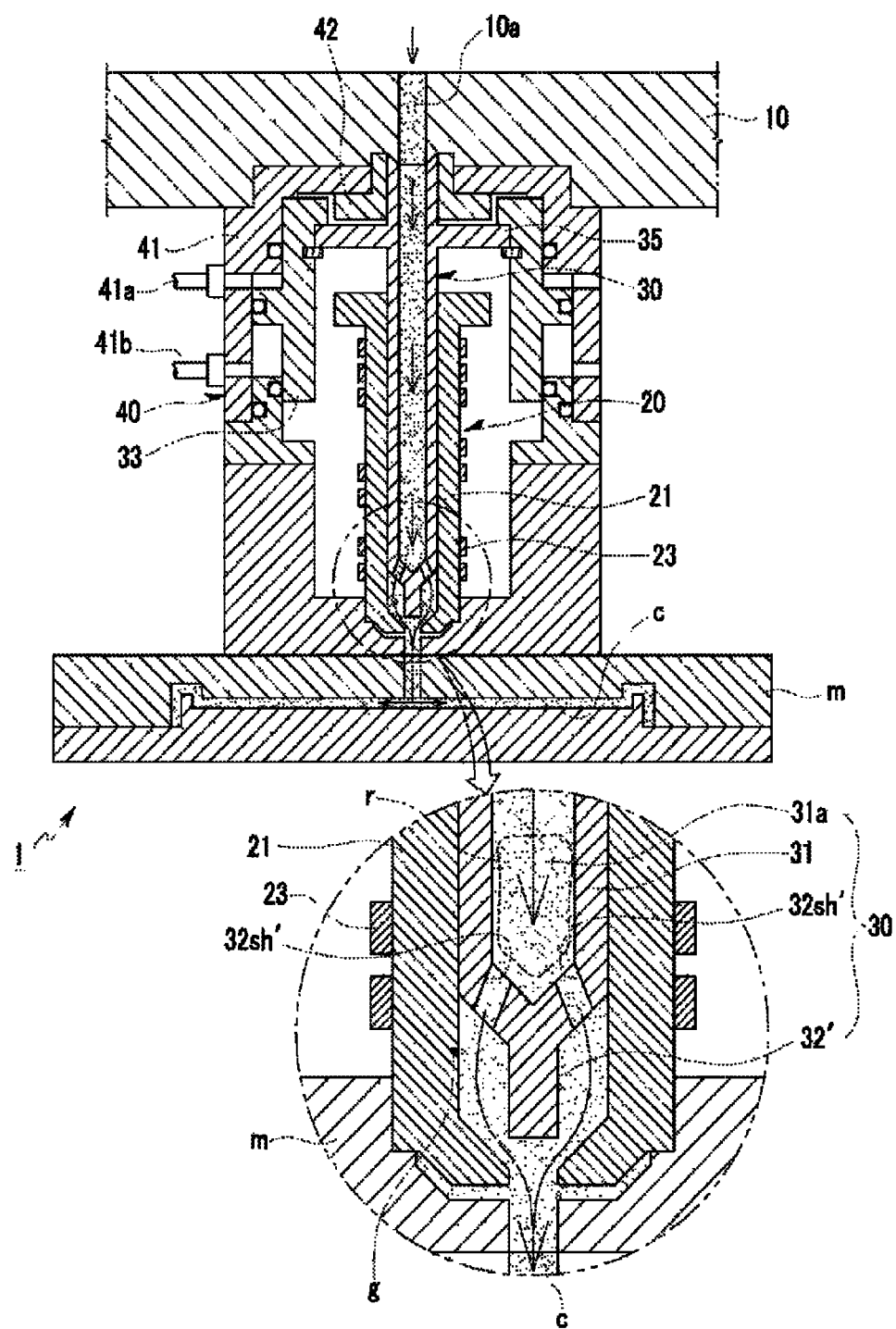
FIGS. 11 to 14 are cross-sectional diagrams for describing an operation of a hot runner valve apparatus for an injection-molding machine according to another exemplary embodiment of the present invention.
Figure 12:
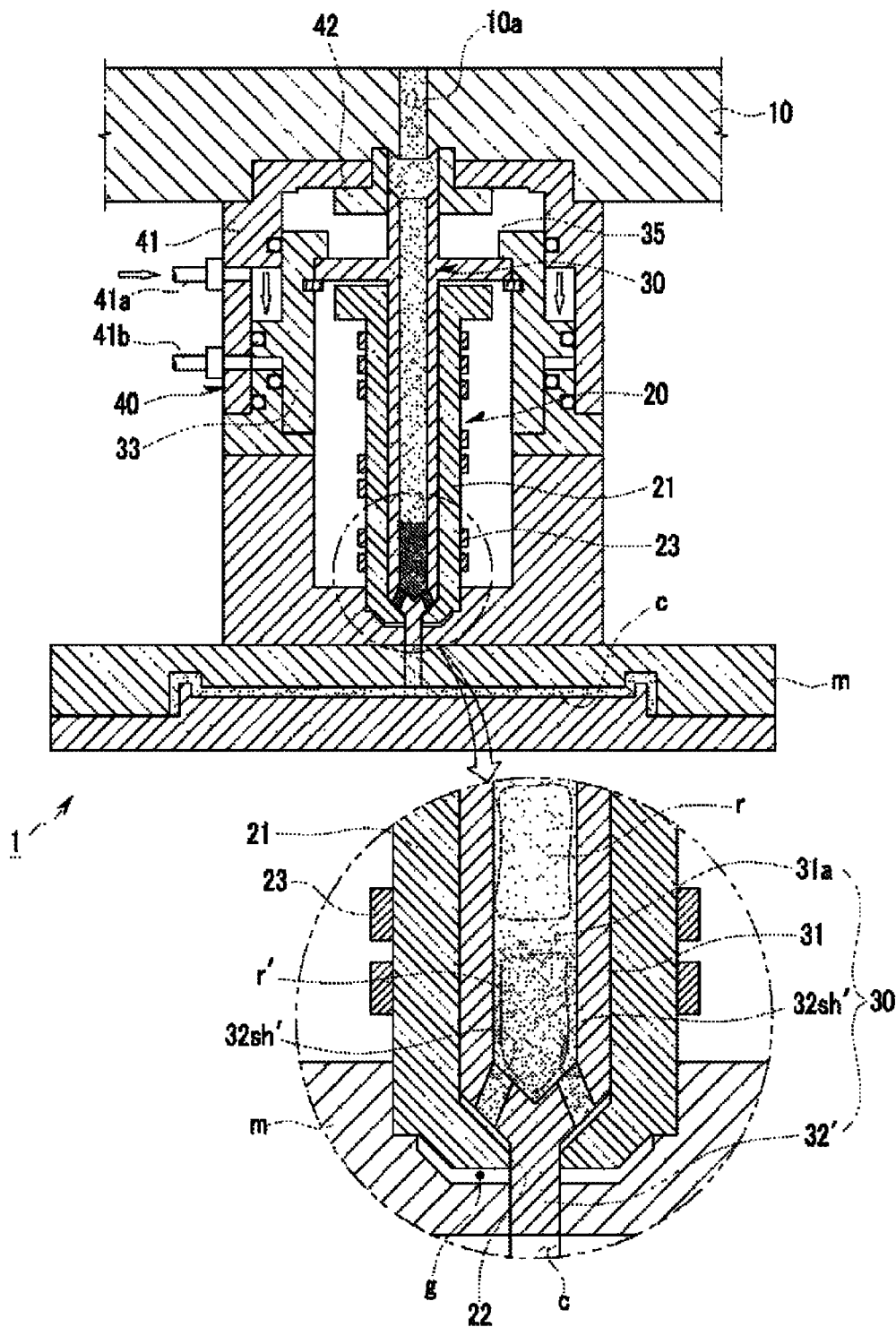
Figure 13:
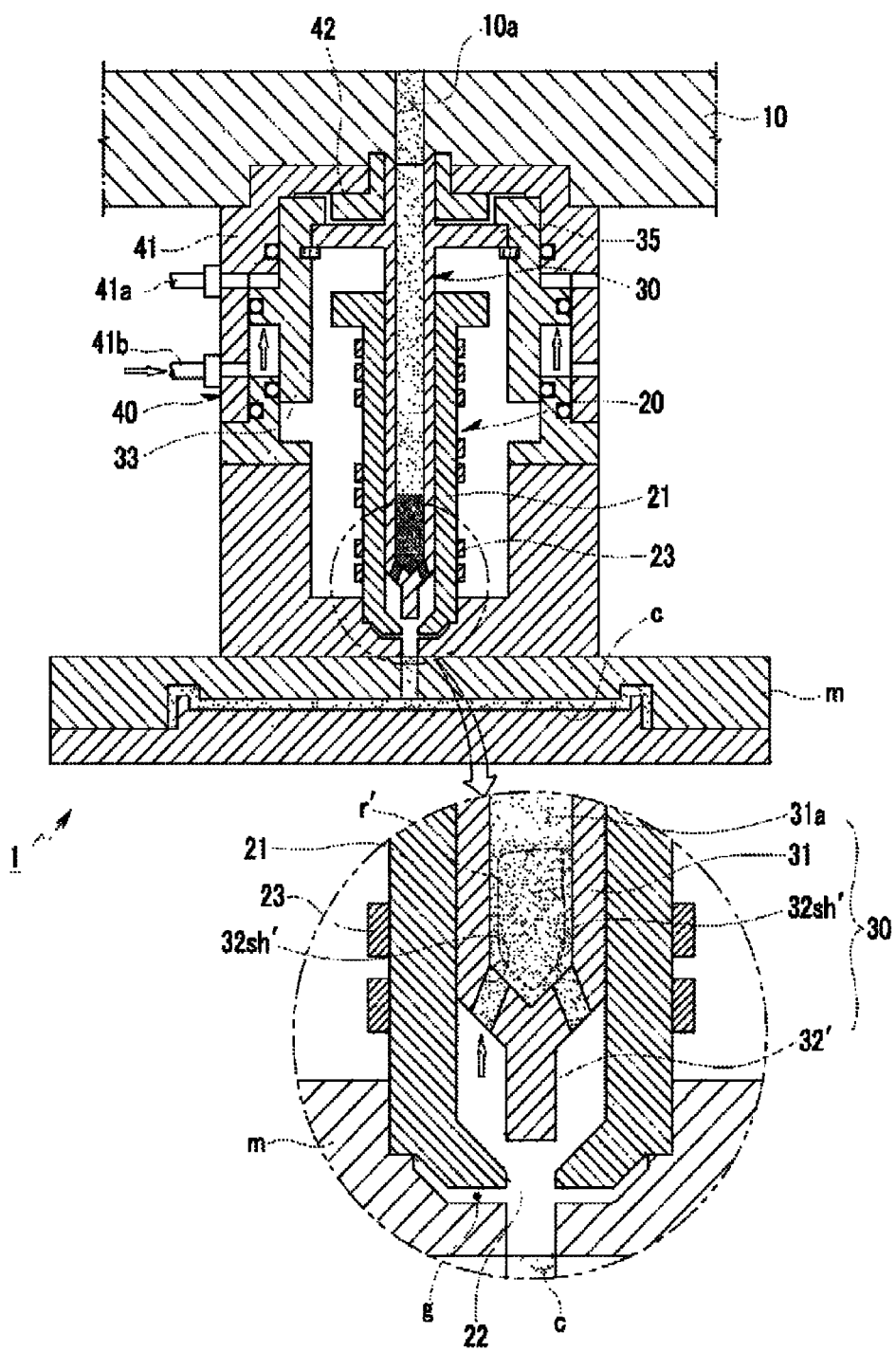
Figure 14:
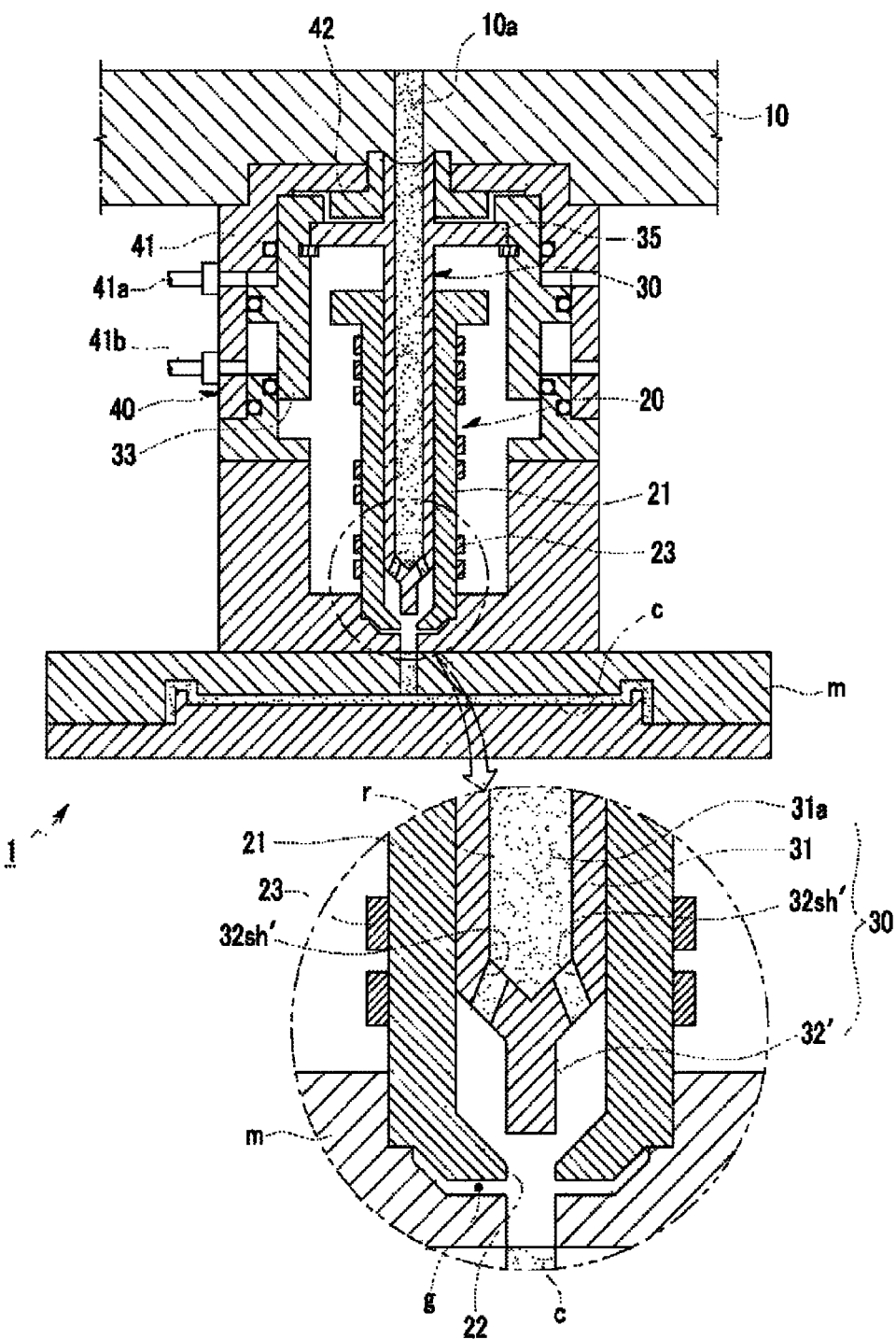

FIGS. 11 to 14 are cross-sectional diagrams illustrating a valve apparatus according to another exemplary embodiment of the present invention, and FIG. 11 illustrates a state where an elevating pin 30 is raised for injecting a resin supplied to a resin flow path 31a into a cavity c of a mold m, FIG. 12 is a diagram illustrating a state for blocking a supply of the resin to the cavity c of the mold m and simultaneously maintaining dwelling for the cavity c of the mold m by closing a side extraction path 32sh' by lowering the elevating pin 30, FIG. 13 illustrates a state for melting a solidified resin r' around the side extraction path 32sh' by raising the elevating pin 30 when a molded article filled in the cavity c of the mold m is cooled, and FIG. 14 illustrates a state where the solidified resin r' around the side extraction path 32sh' is completely melted to become a melted resin r.

The hot runner valve apparatus 1 for the injection-molding machine in the present exemplary embodiment is almost identical to the configuration of the aforementioned exemplary embodiment. However, a principal technical characteristic of the present exemplary embodiment is that the hot runner valve apparatus 1 for the injection-molding machine is configured such that the resin is supplied in a state where the elevating pin 30 is raised within a body 21 of a nozzle 20, and a flow of the resin supplied to the mold m is interrupted when the elevating pin 30 is lowered.

To this end, the hot runner valve apparatus 1 for the injection-molding machine of the present exemplary embodiment generally includes a manifold 10 provided with a resin path 10a therein so as to receive the resin from an injection cylinder (not illustrated) and branch the received resin into several parts, the nozzle 20 connected to one side of the manifold 10 to receive the resin and inject the received resin into the cavity c of the mold m, an elevating pin 30 installed inside the nozzle 20 to control a flow of the resin injected inside the cavity c of the mold m through selective elevation thereof, and a driving means 40 for changing the position of the elevating pin 30 to upper and lower positions. Here, the configurations of the manifold 10, the nozzle 20, and the driving means 40 are the same as those of the aforementioned exemplary embodiment, and it would be acceptable that a heat blocking gap g formed between a lower surface of a body 21 of the nozzle 20 and the mold m is not applied.

In the present exemplary embodiment, the elevating pin 30 is a tube-shaped member having an empty internal space, which is provided so that an end of the elevating pin 30 is slidingly fitted to an installation hole 21a of the body 21 forming the nozzle 20, and a resin flow path 31a connected to a resin path 10a of the manifold 10 is formed at the center of the elevating pin 30, and a flow control tip 32' closed while having a decreased diameter protrudes from a lower end portion of the elevating pin 30. Further, a plurality of side extraction paths 32sh connected to the resin flow path 31a passes through a connection portion of a body portion (not referenced) and the flow control tip 32' of the elevating pin 30, and the resin introduced through the resin flow path 31a is injected into the cavity c of the mold m via the side extraction paths 32sh' and an exit hole 22 of the body 21. When the elevating pin 30 is raised, the flow control tip 32' is positioned inside the body 21 of the nozzle 20, and when the elevating pin 30 is lowered, a lower surface of the flow control tip 32' passes through the exit hole 22 of the body 21 to block an exit side of the cavity c of the mold m.

An operation of the hot runner valve apparatus for the injection-molding machine according to another exemplary embodiment of the present invention including the aforementioned configuration will be described below.

As illustrated in FIG. 11, in a state where the elevating pin 30 is raised, the flow control tip 32' is positioned inside the body 21 of the nozzle 20, and in this state, when the resin supplied from an injection cylinder (not illustrated) is supplied to the resin flow path 31a of the elevating pin 30 via the resin path 10a of the manifold 10 and a bushing 42 of the driving means 40, a melted resin r on the resin flow path 31a is injected into the cavity c of the mold m via the side extraction paths 32sh' and the exit hole 22 of the body 21. Next, when the resin is completely filled in the cavity c of the mold m, a resin supply pressure applied to the resin flow path 31a of the elevating pin 30 is removed and simultaneously, the elevating pin 30 is lowered so that the flow control tip 32' is inserted into the exit hole 22 and thus an end of the flow control tip 32' closes an exit of the cavity c of the mold m as illustrated in FIG. 12. In this state, the end portion of the flow control tip 32' is in contact with the mold m, so that a heat loss phenomenon, in which the flow control tip 32' loses heat to the mold m, is generated to form the solidified resin r' which is in a state where the resin at the lower portion of the elevating pin 30, that is, around the side extraction paths 32sh', is solidified as illustrated in the drawing.

Next, a series of a dwelling process, a cooling process, an extraction process, and the like for extracting a molded article is performed on the mold m, the elevating pin 30 is raised so that the flow control tip' 32' is positioned inside the body 21 of the nozzle 20 as illustrated in FIG. 13. In this state, the body 21 of the nozzle 20 is in a high temperature state by the heater 23, so that the solidified resin r' around the side extraction paths 32sh' of the elevating pin 30 is converted to the melted resin r which is the resin in the melted state as illustrated in FIG. 14.

In the meantime, the side extraction path 32sh' in the present invention has a diameter of only several mm, and maintains a state in which the resin does not naturally run down or flow before the injection pressure is applied from the injection cylinder because the resin has viscosity.

The present invention is not limited to the exemplary embodiments described herein, and may be employed by changing a part to which the exemplary embodiment is applied, and it would be appreciated by those skilled in the art that various changes and modifications might be made to these embodiments without departing from the spirit and the scope of the invention.

The invention claimed is:

1. A hot runner valve apparatus for an injection-molding machine comprising:
   a manifold provided with a resin path;
   a nozzle connected to one side of the manifold to receive a resin and guide the received resin to a cavity side of a mold, the nozzle having an exterior peripheral surface around which a heater is wound; and
   a driving means including an elevating element elevated by using at least one of hydraulic pressure, pneumatic pressure and a motor,
   wherein the nozzle includes a body provided with an installation cylindrical aperture passing through a center thereof, and an exit aperture having a decreased diameter compared to the installation cylindrical aperture at a lower side thereof, and
   the hot runner valve apparatus further comprises an elevating pin of said elevating element, one end of which is slidingly received within the installation cylindrical aperture and one side of which is connected to an elevating element, so that a lower end portion of the elevating pin is positioned inside the nozzle when the elevating pin is raised, and a lower surface of the elevating pin is in contact with the mold, and an upper end portion of the elevating pin is connected to the resin path so as to receive the resin and a lower end portion of the elevating pin is provided with a flow control tip while passing through an exit hole so that the received resin is injected to the cavity of the mold.

2. The hot runner valve apparatus of claim 1, wherein the elevating pin is provided with a resin flow path operable to be connected to a manifold at a center thereof, and an extraction path connected with the resin flow path passes through the center of the flow control tip.

3. The hot runner valve apparatus of claim 1, wherein the elevating pin is provided with a resin flow path operable to be connected to a manifold at a center thereof, and is provided with two to six side extraction paths at a portion connected with the flow control tip.

4. The hot runner valve apparatus of claim 1, wherein the driving means includes a cylinder housing provided with air channels for supplying and discharging high-pressure air to and from said cylindrical housing and a piston positioned within the cylinder housing to be elevated by high-pressure air selectively introduced through the air channels, and one exterior end portion of the elevating pin, which does not interfere with a position when the elevating pin is elevated, is integrally connected with an interior side of the piston to interact with the piston.

5. The hot runner valve apparatus of claim 4, wherein the driving means includes
   a bushing, which is operable to be connected with the resin path of a manifold at one side of an upper portion of the driving means, and into which the upper end portion of the elevating pin is slidingly inserted.

6. The hot runner valve apparatus of claim 1, wherein the body is provided so as to form a heat blocking gap between a lower surface of the body and a mold.

* * * * *